(12) United States Patent
Jung et al.

(10) Patent No.: US 11,075,543 B2
(45) Date of Patent: Jul. 27, 2021

(54) WIRELESS POWER TRANSMITTING DEVICE AND ELECTRONIC DEVICE FOR WIRELESSLY RECEIVING POWER

(71) Applicant: Samsung Electronics Co., Ltd., Gyeonggi-do (KR)

(72) Inventors: Ji-Hoon Jung, Seoul (KR); Ki-Young Kim, Gyeonggi-do (KR); Dae-Hyun Kim, Incheon (KR); Young-Joon Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 562 days.

(21) Appl. No.: 15/966,686

(22) Filed: Apr. 30, 2018

(65) Prior Publication Data

US 2018/0316226 A1  Nov. 1, 2018

Related U.S. Application Data

(60) Provisional application No. 62/491,521, filed on Apr. 28, 2017, provisional application No. 62/520,777, filed on Jun. 16, 2017.

(30) Foreign Application Priority Data

Jul. 28, 2017 (KR) ................. 10-2017-0096449

(51) Int. Cl.
*H02J 50/12* (2016.01)
*H02J 7/02* (2016.01)
*H02J 50/05* (2016.01)
*H02J 50/40* (2016.01)

(52) U.S. Cl.
CPC ........... *H02J 50/12* (2016.02); *H02J 7/025* (2013.01); *H02J 50/05* (2016.02); *H02J 50/40* (2016.02)

(58) Field of Classification Search
CPC .. H02J 50/05; H02J 50/12; H02J 50/40; H02J 7/0072; H02J 7/025; H02H 7/1227
USPC ......................... 320/108, 138, 140
See application file for complete search history.

(56) References Cited

U.S. PATENT DOCUMENTS

| | | | |
|---|---|---|---|
| 5,917,716 A | * | 6/1999 | Cho ............ H02H 7/1227 363/21.14 |
| 2015/0364929 A1 | * | 12/2015 | Davis ............ H01F 38/14 307/104 |
| 2016/0301251 A1 | | 10/2016 | Cho |

* cited by examiner

*Primary Examiner* — Edward Tso
*Assistant Examiner* — Aaron Piggush
(74) *Attorney, Agent, or Firm* — The Farrell Law Firm, P.C.

(57) ABSTRACT

A wireless power transmitting device for wirelessly transmitting power to an electronic device is provided. The wireless power transmitting device includes a first coil configured to have a first number of windings and to receive power to be transmitted to the electronic device, thereby generating a magnetic field; and a second coil configured to have a second number of windings, which is different from the first number of windings, wherein an induced electromotive force generated, based on the magnetic field generated from the first coil, in the second coil is used for operation of at least one hardware component of the wireless power transmitting device, and wherein a ratio of a voltage applied to the first coil to a voltage applied to the second coil is determined by a ratio of the first number of windings to the second number of windings.

10 Claims, 13 Drawing Sheets

WIRELESS POWER TRANSMITTING DEVICE AND ELECTRONIC DEVICE FOR WIRELESSLY RECEIVING POWER

CROSS-REFERENCE TO RELATED APPLICATION(S)

This application is based on and claims priority under 35 U.S.C. § 119 to U.S. Provisional Patent Application Ser. No. 62/491,521, which was filed in the U.S. Patent and Trademark Office on Apr. 28, 2017, U.S. Provisional Patent Application Ser. No. 62/520,777, which was filed in the U.S. Patent and Trademark Office on Jun. 16, 2017 and Korean Patent Application Serial No. 10-2017-0096449, which was filed in the Korean Intellectual Property Office on Jul. 28, 2017, the disclosure of each of which is incorporated herein by reference in its entirely.

BACKGROUND

1. Field

The present disclosure relates to a wireless power transmitting device for wirelessly transmitting power and an electronic device for wirelessly receiving power.

2. Description of Related Art

Portable digital communication devices are currently essential for many people. Consumers want various high-quality services to be provided anywhere and at any time. Recently, due to the Internet of things (IoT), various sensors, home appliances, and communication devices have been connected to a single network. In order to effectively operate the various sensors, a wireless power transmitting system is needed.

Wireless power transmission is conducted by a magnetic induction method, a magnetic resonance method, and an electromagnetic-wave method. The magnetic induction or magnetic resonance method is advantageous for charging an electronic device located relatively close to a wireless power transmitting device. The electromagnetic-wave method is more advantageous for long-distance power transmission of several meters, compared to the magnetic induction or magnetic resonance method. The electromagnetic-wave method is mainly used for long-distance power transmission, and is able to detect the exact position of a power receiver in the distance, thereby transmitting power most efficiently.

A wireless power transmitting device is typically wired to a wall power source, and may process power received from the wall power source to transmit the same to various electronic devices. The voltage of the power supplied from the wall power source may be set according to a national standard, and may be, for example, 110V or 220V. The wireless power transmitting device may process the power provided from the wall power source to thus provide the same to a power transmitting coil (e.g., a primary coil). In addition, the wireless power transmitting device may operate various hardware components (e.g., a communication circuit, a control circuit, an inverter, or the like) contained therein using the power provided from the wall power source. The various hardware components contained in the wireless power transmitting device generally have operation voltages lower than the voltage of the wall power source. Accordingly, the wireless power transmitting device must use an adapter that performs an operation, such as down-converting the voltage from the wall power source, and may process the power from the wall power source using the adapter to provide the same to the respective hardware components. However, the accommodation of the adapter will increase the production cost, as well as the volume and weight of the wireless power transmitting device. Furthermore, an electronic device for wirelessly receiving power must include an adapter in order to provide the wirelessly received power to various hardware components.

SUMMARY

An aspect of the present disclosure provides a wireless power transmitting device that includes a plurality of coils and is capable of providing hardware with an induced electromotive force, which is derived in a coil by means of a magnetic field generated from a power transmitting coil.

Another aspect of the present disclosure provides an electronic device that is capable of providing induced electromotive forces, which are generated in respective coils by means of a magnetic field generated from a power transmitting coil, to respective hardware components.

Another aspect of the present disclosure provides a wireless power transmitting device that includes a plurality of coils and is capable of providing hardware with an induced electromotive force, which is derived in a coil by means of a magnetic field generated from a power transmitting coil.

Another aspect of the present disclosure provides an electronic device that is capable of providing an induced electromotive force, which is generated in respective coils by means of a magnetic field generated from a power transmitting coil, to respective hardware components.

Another aspect of the present disclosure provides a wireless power transmitting device and an electronic device that are not required to include hardware, such as an adapter, thereby reducing the volume, weight, and production cost thereof.

In accordance with an embodiment, a wireless power transmitting device for wirelessly transmitting power to an electronic device is provided. The wireless power transmitting device includes a first coil configured to have a first number of windings and to receive power to be transmitted to the electronic device, thereby generating a magnetic field; and a second coil configured to have a second number of windings, which is different from the first number of windings, wherein an induced electromotive force generated, based on the magnetic field generated from the first coil, in the second coil is used for operation of at least one hardware component of the wireless power transmitting device, and wherein a ratio of a voltage applied to the first coil to a voltage applied to the second coil is determined by a ratio of the first number of windings to the second number of windings.

In accordance with another embodiment, an electronic device for wirelessly receiving power from a wireless power transmitting device is provided. The electronic device includes a first hardware component configured to have a first operation voltage; a second hardware component configured to have a second operation voltage different from the first operation voltage; a first coil configured to generate a first induced electromotive force using a magnetic field generated from the wireless power transmitting device; and a second coil configured to generate a second induced electromotive force using the magnetic field generated from the wireless power transmitting device, wherein the first induced electromotive force is used for operation of the first hardware component and the second induced electromotive force is used for operation of the second hardware component.

BRIEF DESCRIPTION OF THE DRAWINGS

The above and other aspects, features, and advantages, of the present disclosure will be more apparent from the following detailed description, taken in conjunction with the accompanying drawings, in which.

DETAILED DESCRIPTION

Figure 1:
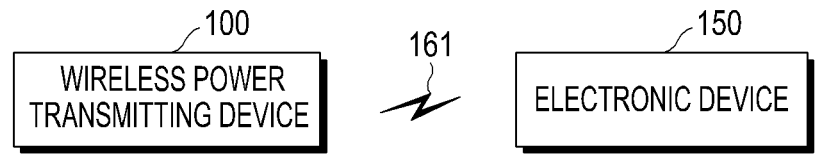
FIG. 1 is a block diagram of a wireless power transmitting device and an electronic device according to an embodiment.

Hereinafter, various embodiments are described with reference to the accompanying drawings. The embodiments and the terms used herein are not intended to limit the present disclosure to specific forms, and should be understood to include various modifications, equivalents, and/or alternatives to the corresponding embodiments. In describing the accompanying drawings, similar reference numerals may be used to designate similar elements. A singular expression may include a plural expression unless they are definitely different in a context. As used herein, singular forms may include plural forms as well unless the context clearly indicates otherwise. The expressions "a first", "a second", "the first", and "the second" used in the present disclosure may modify various components regardless of the order and/or the importance but is not intended to limit the corresponding components. When an element (e.g., a first element) is referred to as being "(functionally or communicatively) connected," or "directly coupled" to another element (e.g., a second element), the element may be connected directly to the other element or connected to the other element through yet another element (e.g., a third element).

The expression "configured to" as used in the present disclosure may be interchangeably used with, for example, "suitable for", "having the capacity to", "designed to", "adapted to", "made to", and "capable" of in terms of hardware or software, according to circumstances. Alternatively, in some situations, the expression "device configured to" may indicate that the device, together with other devices or components, "is able to". For example, the phrase "processor adapted (or configured) to perform A, B, and C" may indicate a dedicated processor (e.g., an embedded processor) only for performing the corresponding operations or a general purpose processor (e.g., a central processing unit (CPU) or an application processor (AP)) that may perform the corresponding operations by executing one or more software programs stored in a memory device.

An electronic device according to an embodiment may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). A wireless power transmitting device or an electronic device may include at least one of, for example, a TV set, a set-top box associated with a TV set by wired or wireless communication, a digital video disc (DVD) player, an audio device, a refrigerator, an air conditioner, a cleaner, an oven, a microwave oven, a washing machine, an air purifier, a set-top box, a home automation control panel, a security control panel, a media box, a game console, an electronic dictionary, an electronic key, a camcorder, an electric vehicle, or an electronic frame.

In an embodiment, the electronic device may include at least one of various medical devices (e.g., various portable medical measuring devices (a blood glucose monitoring device, a heart rate monitoring device, a blood pressure measuring device, a thermometer, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, point of sales (POS) device in a shop, or IoT devices (e.g., a light bulb, various sensors, an electric or gas meter, a sprinkler device, a fire alarm, a thermostat, a streetlamp, a toaster, sporting goods, a hot water tank, a heater, a boiler, etc.). An electronic device may include at least one of a part of furniture or a building/structure, an electronic board, an electronic signature receiving device, a projector, and various types of measuring instruments (e.g., a water meter, an electric meter, a gas meter, a radio wave meter, and the like). The wireless power transmitting device or the electronic device may be flexible, or may be configured as a combination of the devices described above. The wireless power transmitting device or the electronic device are not intended to be limited to the above-described devices. In the present disclosure, the term "user" may refer to a person who uses an electronic device, or may refer to a device that uses a wireless power transmitting device or an electronic device (e.g., an artificial intelligence electronic device).

FIG. 1 is a block diagram of a wireless power transmitting device 100 and an electronic device 150 according to an embodiment.

Referring to FIG. 1, the wireless power transmitting device 100 may wirelessly transmit power 161 to the electronic device 150. The wireless power transmitting device 100 may transmit power 161 to the electronic device 150 according to various charging methods. For example, the wireless power transmitting device 100 may transmit the power 161 by an induction method. In the case where the wireless power transmitting device 100 transmits power by an induction method, the wireless power transmitting device 100 may include, for example, a power source, a direct current to alternating current (DC-to-AC) converting circuit, an amplifying circuit, an impedance matching circuit, one or more capacitors, one or more coils, a communication modulation/demodulation circuit, and the like. The one or more capacitors may constitute a resonance circuit together with one or more coils. The wireless power transmitting device 100 may be implemented by the method defined in the Wireless Power Consortium (WPC) standard (or the Qi standard). For example, the wireless power transmitting device 100 may transmit the power 161 by a resonance method. In the case of a resonance method, the wireless power transmitting device 100 may include, for example, a power source, a DC-to-AC converting circuit, an amplifying circuit, an impedance matching circuit, one or more capacitors, one or more coils, an out-band communication circuit {e.g., a Bluetooth low energy (BLE) communication circuit}, and the like. One or more capacitors and one or more coils may constitute a resonance circuit. The wireless power transmitting device 100 may be implemented by the method defined in the Alliance for Wireless Power (A4WP) standard {or the AirFuel™ Alliance (AFA) standard}. The wireless power transmitting device 100 may include a coil capable of generating an induced magnetic field when a current flows therethrough by a resonance method or by an induction method. The process in which the wireless power transmitting device 100 generates an induced magnetic field may be expressed as the wireless power transmitting device 100 wirelessly transmits the power 161. In addition, the electronic device 150 may include a coil that generates an induced electromotive force by means of a magnetic field formed therearound and whose magnitude varies with time. The process in which the electronic device 150 generates an induced electromotive force through a coil may be expressed as the electronic device 150 wirelessly receives the power 161. For example, the wireless power transmitting device 100 may transmit the power 161 by an electromagnetic-wave method. In the case where the wireless power transmitting device 100 transmits power by an electromagnetic-wave method, the wireless power transmitting device 100, for example, may include a power source, a DC-to-AC converting circuit, an amplifying circuit, a distributing circuit, a phase shifter, a power transmitting antenna array including a plurality of patch antennas, an out-band communication circuit (e.g., a BLE communication module), and the like. The respective patch antennas may form radio frequency (RF) waves (e.g., electromagnetic waves). The electronic device 150 may include a patch antenna capable of outputting a current using an RF wave formed therearound. The process in which the wireless power transmitting device 100 forms an RF wave may be expressed as the wireless power transmitting device 100 wirelessly transmits the power 161. The process in which the electronic device 150 outputs current from the patch antenna using an RF wave may be expressed as the electronic device 150 wirelessly receives the power 161.

The wireless power transmitting device 100, according to an embodiment, may communicate with the electronic device 150. For example, the wireless power transmitting device 100 may communicate with the electronic device 150 in an in-band manner. The wireless power transmitting device 100 or the electronic device 150, for example, may change the load (or impedance) for data to be transmitted according to an on/off keying modulation scheme. The wireless power transmitting device 100 or the electronic device 150, based on a change in the magnitude of the current, voltage, or power of the coil, may measure a load change (or impedance change), thereby determining the data to be transmitted from a counterpart device. For example, the wireless power transmitting device 100 may communicate with the electronic device 150 in an out-band manner. The wireless power transmitting device 100 or the electronic device 150 may transmit and receive data using a communication circuit (e.g., a BLE communication module) provided separately from the coil or the patch antenna.

In the present disclosure, the execution of a certain operation by the wireless power transmitting device 100, the electronic device 150, or another electronic device may indicate that various hardware components included in the wireless power transmitting device 100, the electronic device 150, or another electronic device, such as a control circuit (e.g., a processor), a coil, or a patch antenna, execute a certain operation. Alternatively, the execution of a certain operation by the wireless power transmitting device 100, the electronic device 150, or another electronic device may indicate that a processor performs control such that another hardware component executes a certain operation. Alternatively, the execution of a certain operation by the wireless power transmitting device 100, the electronic device 150, or another electronic device may indicate an operation of causing a processor or another hardware component to execute a certain operation by the execution of instructions for performing a certain operation, which are stored in a storage circuit (e.g., a memory) of the wireless power transmitting device 100, the electronic device 150, or another electronic device.

Figure 2:
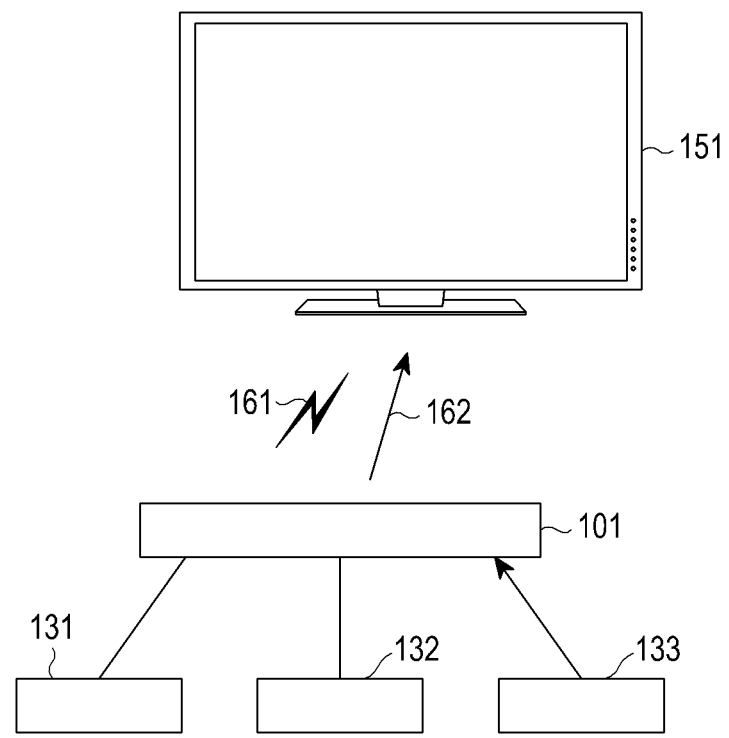
FIG. 2 is an illustration of a media device and a TV set according to an embodiment.

FIG. 2 is an illustration of a media device 101 and a TV set 151 according to an embodiment.

Referring to FIG. 2, the media device 101 may wirelessly transmit power 161 to the TV set 151. The media device 101 may be an example of a wireless power transmitting device 100, and the TV set 151 may be an example of an electronic device 150 that wirelessly receives power. The media device 101 may include a power transmitting circuit by at least one of the various wireless charging methods described above. The media device 101 may transmit a communication signal 162 to the TV set 151. For example, the communication signal 162 may include at least one piece of media data to be displayed on the TV set 151, data for controlling wireless charging, or TV control data for controlling the operation of the TV set 151. The media data, the data for controlling wireless charging, or the TV control data may be transmitted and received by the same communication scheme, or may be transmitted and received by different communication schemes. For example, the media device 101 may transmit media data to the TV set 151 according to a communication scheme defined in the Wireless Gigabit Alliance (WiGig™), may transmit and receive wireless charging control data according to a BLE communication scheme, and may transmit TV control data to the TV set 151 using an infrared (IR) module, but the present disclosure is not limited to a certain communication scheme. For example, the TV set 151 may include an IR module for receiving a control signal from a control device, such as a remote controller, by an IR communication scheme, and may receive, from the media device 101, a communication signal 162 including TV control data. The control signal may be a signal including an operation execution command, and indicates a signal transmitted from a control device, or may be referred to as an "operation execution command". The transmission of the control signal by the control device is not limited to a certain communication scheme. In an embodiment, at least two pieces of media data, wireless charging control data, and TV control data may be transmitted and received by a single communication module. For example, the media device 101 may transmit the media data to the TV set 151 through a WiGig™ communication scheme, and may transmit the wireless charging control data and the TV control data through a BLE module. The media device 101 may communicate with peripheral devices 131, 132, and 133 through wired or wireless communication. For example, the media device 101 may communicate with a first peripheral device 131 by means of a cable conforming to the high-definition multimedia interface (HDMI) standard, may communicate with a second peripheral device 132 by means of a cable conforming to the universal serial bus (USB) standard, and may communicate with a third peripheral device 133 by means of wireless communication according to the BLE communication scheme. The peripheral devices 131, 132, and 133 may be electronic devices, such as a game console, a set-top box, a DVD player, or the like, which are able to transmit media data by wired or wireless communication. The media device 101 may include at least one piece of media data received from the peripheral devices 131, 132 and 133 in the communication signal 162 to then transmit the same to the TV set 151. The media device 101 may transmit the received media data directly to the TV set 151, or may transmit the received media data to the TV set 151 after transcoding the same. The media device 101 may process the received media data, such as decoding or image correction, and may transmit the same to the TV set 151. Alternatively, the media device 101 may transmit media data generated by the media device 101 to the TV set 151, instead of receiving the media data from the peripheral devices 131, 132, and 133. In this case, the media device 101 may be implemented as an electronic device, such as a game console, a set-top box, a DVD player, or the like, which is capable of generating media data. The media device 101 is merely exemplified to wirelessly transmit power and transmit media data, and in an embodiment, the wireless power transmitting device and the electronic device for transmitting media data may be implemented as different entities. The media device 101 is only an example, and a device, such as a sound bar, may wirelessly transmit power to the TV set.

Figure 3A:
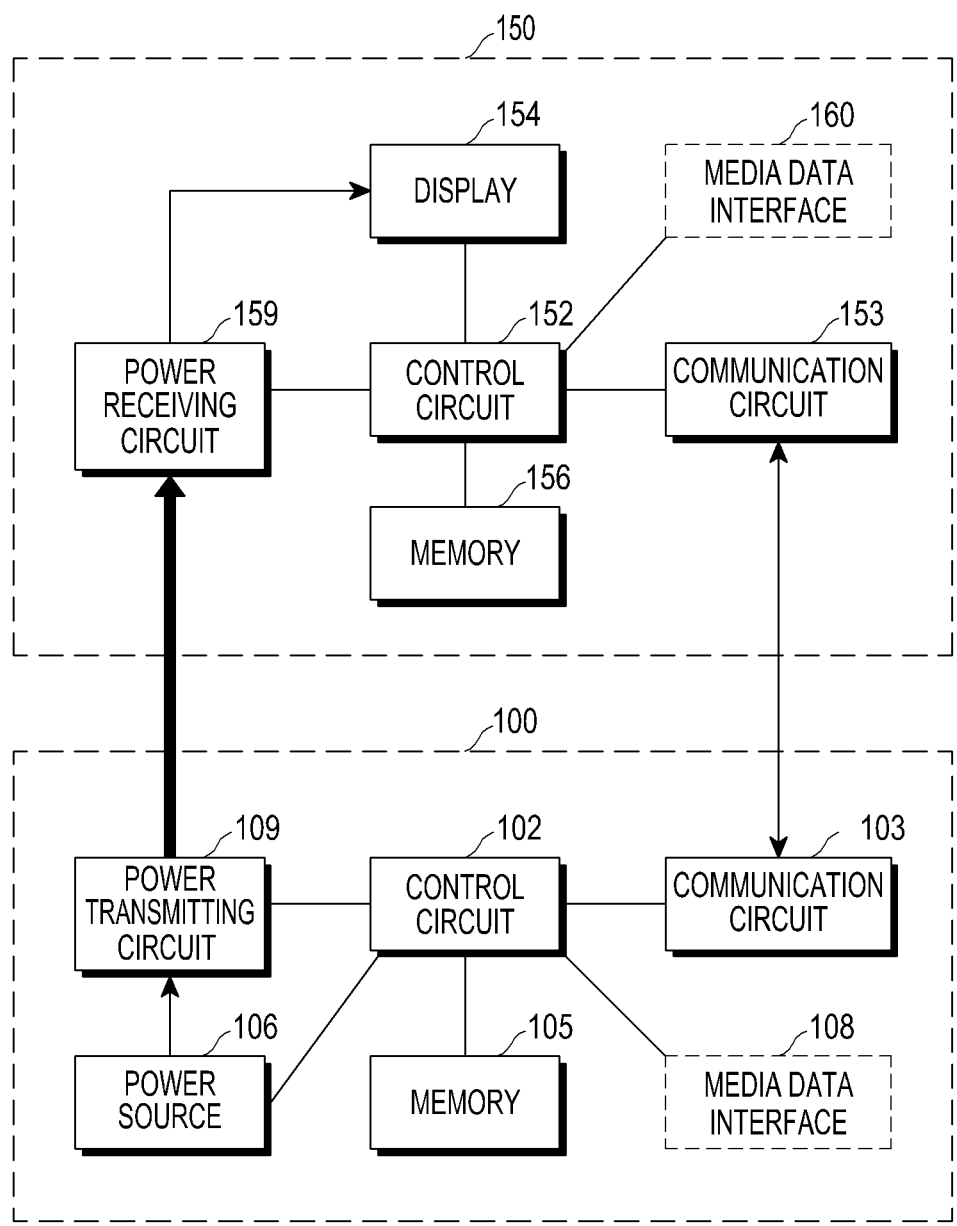
FIG. 3A is a block diagram of a wireless power transmitting device and an electronic device according to an embodiment.

FIG. 3A is a block diagram of a wireless power transmitting device 100 and an electronic device 150 according to an embodiment.

Referring to FIG. 3A, the wireless power transmitting device 100 may include a power transmitting circuit 109, a control circuit 102, a communication circuit 103, a memory 105, a power source 106, and a media data interface 108. The electronic device 150 may include a power receiving circuit 159, a control circuit 152, a communication circuit 153, a display 154, a memory 156, and a media data interface 160.

The power transmitting circuit 109, according to an embodiment, may wirelessly transmit power to the power receiving circuit 159 by at least one of an induction method, a resonance method, and an electromagnetic-wave method. The configurations of the power transmitting circuit 109 and the power receiving circuit 159 are described below in greater detail with reference to FIGS. 3B and 3C. The control circuit 102 may control the magnitude of the power transmitted by the power transmitting circuit 109. For example, the control circuit 102 may control the magnitude of the power transmitted by the power transmitting circuit 109 by controlling the magnitude of the power output from the power source 106 or by controlling the amplification gain of a power amplifier included in the power transmitting circuit 109. The control circuit 102 may adjust the magnitude of the power output from the power source 106 by controlling a duty cycle or frequency of the power output from the power source 106. The power source 106, for example, may include a power interface connectable to a wall power source, and may receive AC power having a voltage set for each country from the wall power source to thus transmit the same to the power transmitting circuit 109.

The control circuit 102 may control the magnitude of the power applied to the power transmitting circuit 109 by controlling the magnitude of a bias voltage of the power amplifier. The control circuit 102 or the control circuit 152 may be implemented by various circuits capable of performing operations, such as a common processor (e.g., a CPU), a mini-computer, a microprocessor, a micro-controlling unit (MCU), a field programmable gate array (FPGA), or the like, but is not limited to a certain type. The control circuit 102 may control at least one of the power source 106 or the power transmitting circuit 109 so as to transmit, for example, a first magnitude of power.

The power receiving circuit 159, according to an embodiment, may wirelessly receive power from the power transmitting circuit 109 by at least one of an induction method, a resonance method, and an electromagnetic-wave method. The power receiving circuit 159 may process the received power by rectifying an AC waveform of the power into a DC waveform, converting the voltage thereof, or regulating the power. The display 154, for example, may display media data received from the media device 101, and various hardware components, in addition to the display 154, may be included in the electronic device 150. The control circuit 152 may control the overall operation of the electronic device 150. The memory 156 may store instructions for performing the overall operation of the electronic device 150, and may store information for determining the magnitude of the power to be transmitted. The display 154 may include, for example, a liquid crystal display (LCD), a light emitting-diode (LED) display, an organic light-emitting diode (OLED) display, a micro-electromechanical systems (MEMS) display, or an electronic paper display. The control circuit 152 may receive media data through the communication circuit 153. The control circuit 102 may perform control such that the media data received through the media data interface 108 is transmitted to the electronic device 150 through the communication circuit 103. The control circuit 102 may receive media data from peripheral devices through the media data interface 108 by wired or wireless communication. The control circuit 102 may include the received media data in a communication signal to thus transmit the same to the electronic device 150 through the communication circuit 103. The control circuit 102 may perform control such that the received media data is transmitted to the electronic device 150 after performing transcoding, decoding, or an image improving process thereof. In the case where the wireless power transmitting device and the media device are implemented as different entities, the control circuit 152 may receive media data from the media device through the media data interface 160 by wired or wireless communication.

The memory 105 may store instructions for performing operations of the wireless power transmitting device 100, and may store, for example, information for determining the magnitude of the power to be transmitted. The memory 105 or the memory 156 may be implemented in various forms, such as a read-only memory (ROM), a random access memory (RAM), or a flash memory, and is not limited to a certain form.

The control circuit 102, the power transmitting circuit 109, the communication circuit 103, and the memory 105 of the wireless power transmitting device 100 may be operated using power from the power source 106. The wireless power transmitting device 100, according to an embodiment, may further include other coils, in addition to a power transmitting coil in the power transmitting circuit 109. Other coils may generate an induced electromotive force by a magnetic field generated in the power transmitting coil, and the generated induced electromotive force may be provided to at least one of the control circuit 102, the power transmitting circuit 109, the communication circuit 103, or the memory 105. Turn ratios of the power transmitting coil to other coils may be set according to, for example, the ratios of a voltage of the power supplied from the wall power source to the voltages used by respective hardware components, which are described below in greater detail with reference to FIG. 4.

The electronic device 150, according to an embodiment, may include a plurality of coils in the power receiving circuit 159. An induced electromotive force may be generated in the respective coils by means of a magnetic field generated by the power transmitting coil, and the generated induced electromotive force may be applied to at least one of the control circuit 152, the power transmitting circuit 159, the communication circuit 153, the memory 156, and the display 154. The turns of the respective coils may be different.

Figure 3B:
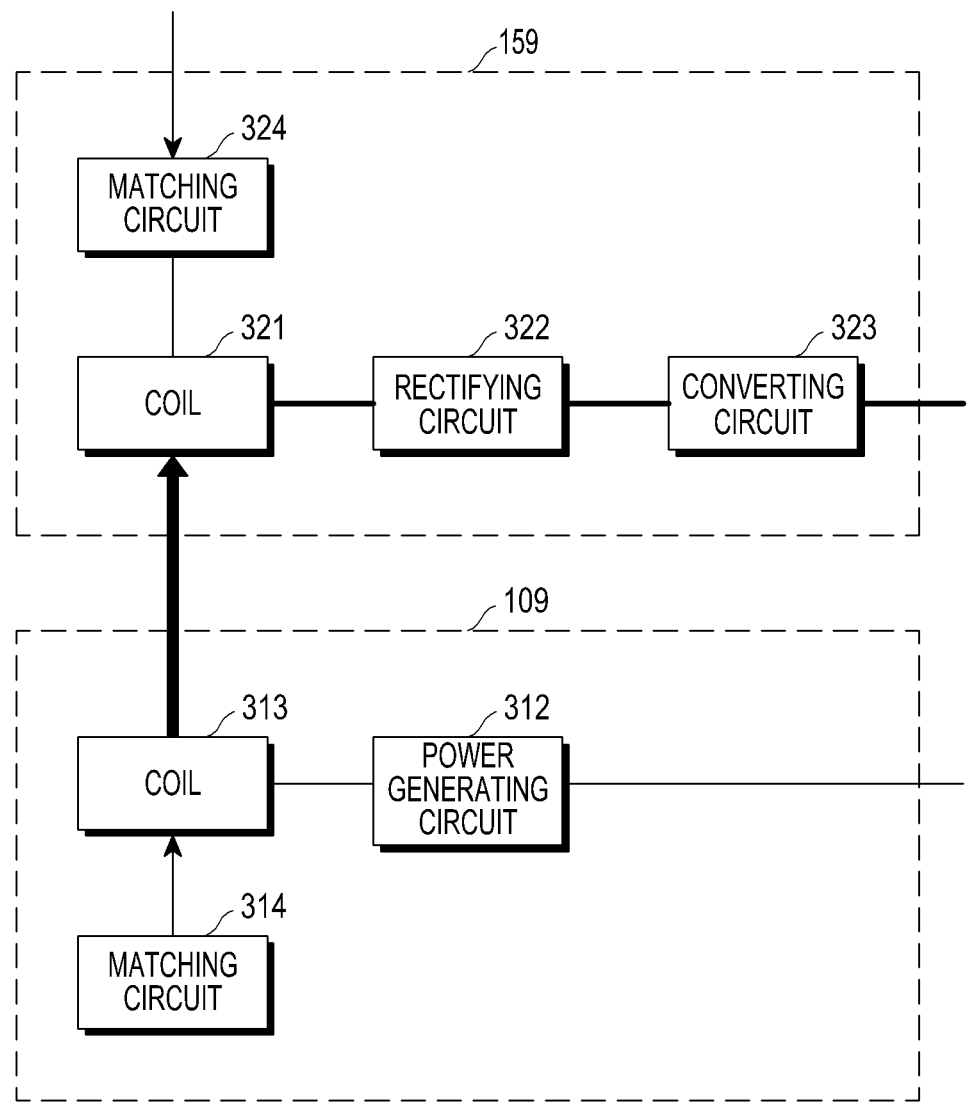
FIG. 3B is a block diagram of a power transmitting circuit and a power receiving circuit in an induction method or resonance method according to an embodiment.

FIG. 3B is a block diagram of a power transmitting circuit 109 and a power receiving circuit 159 in an induction method or resonance method according to an embodiment.

Referring to FIG. 3B, the power transmitting circuit 109 may include a power generating circuit 312, a coil 313, and a matching circuit 314. The power generating circuit 312 may rectify AC power received externally, and may then invert the rectified power to thus provide the same to the coil. Voltages of a maximum value and zero may be alternately applied to the coil 313 in a predetermined cycle through an inverting operation, thereby generating a magnetic field in the coil 313. The inverting frequency (i.e., the frequency of an AC waveform applied to the coil 313) may be set to 100 kHz to 205 kHz or 6.78 MHz or the like according to a standard, but the inverting frequency is not limited thereto. When power is applied to the coil 313, an induced magnetic field whose magnitude changes with time may be formed from the coil 313, so that the power may be transmitted wirelessly. Capacitors constituting a resonance circuit together with the coil 313 may be further included in the power transmitting circuit 109. The matching circuit 314 may change at least one of the capacitance or reactance of a circuit connected to the coil 313 under the control of the control circuit 102 so as to perform impedance matching between the power transmitting circuit 109 and the power receiving circuit 159. An induced electromotive force may be generated in the coil 321 of the power receiving circuit 159 by means of a magnetic field formed therearound and whose magnitude varies with time, so that the power receiving circuit 159 may wirelessly receive power. A rectifying circuit 322 may rectify the received power of an AC waveform. A converting circuit 323 may adjust a voltage of the rectified power, and may transmit the same to hardware. The power receiving circuit 159 may further include a regulator, or the converting circuit 323 may be replaced with a regulator. The matching circuit 324 may change at least one of the capacitance or reactance of a circuit connected to the coil 321 under the control of the control circuit 152 so as to perform impedance matching between the power transmitting circuit 109 and the power receiving circuit 159. Alternatively, an induced electromotive force generated in another coil may be provided to the control circuit 152 or the like.

Figure 3C:
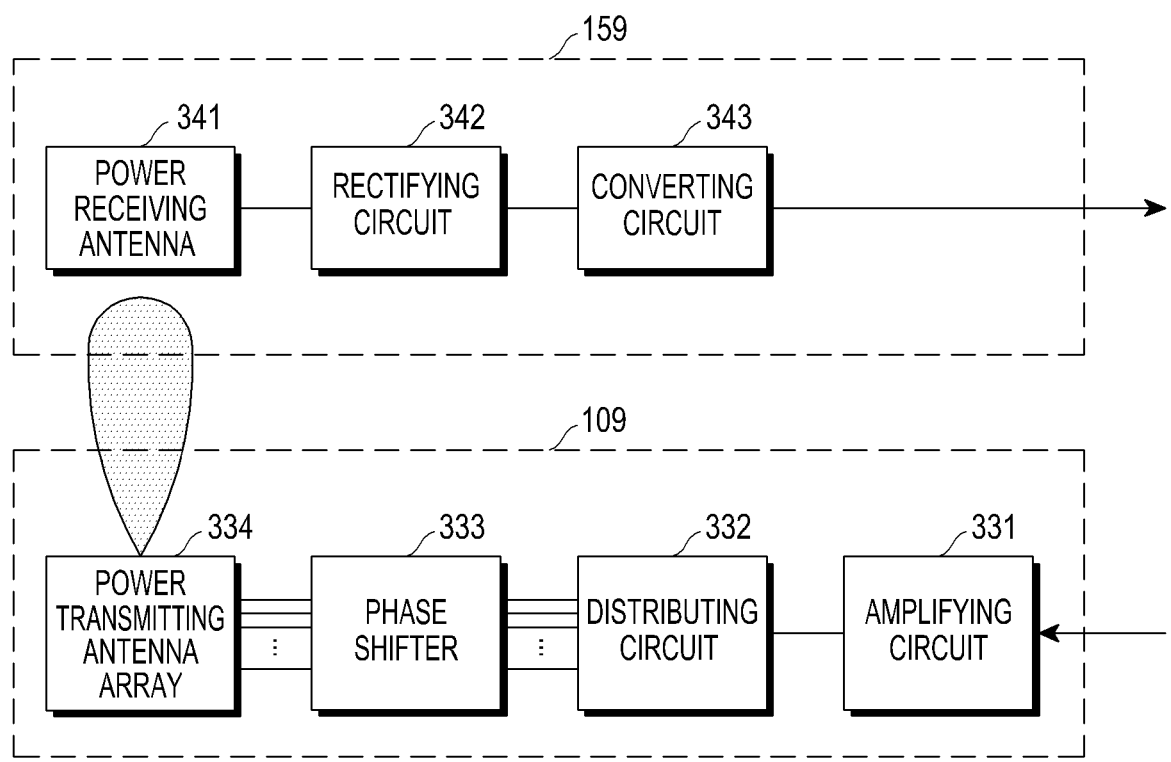
FIG. 3C is a block diagram of a power transmitting circuit and a power receiving circuit in an electromagnetic-wave method according to an embodiment.

FIG. 3C is a block diagram of a power transmitting circuit 109 and a power receiving circuit 159 in an electromagnetic-wave method according to an embodiment.

Referring to FIG. 3C, the power transmitting circuit 109 may include an amplifying circuit 331, a distributing circuit 332, a phase shifter 333, and a power transmitting antenna array 334. The power receiving circuit 159 may include a power receiving antenna 341, a rectifying circuit 342, and a converting circuit 343.

The amplifying circuit 331 may amplify the power supplied from the power source 106 to thus provide the same to the distributing circuit 332. The amplifying circuit 331 may be implemented by a variety of amplifiers, such as a drive amplifier (DA), a high-power amplifier (HPA), a gain block amplifier (GBA), or a combination thereof, but is not limited thereto. The distributing circuit 332 may distribute the power output from the amplifying circuit 331 to a plurality of paths. Any circuit capable of distributing input power or signals to a plurality of paths may be adopted as the distributing circuit 332. For example, the distributing circuit 332 may distribute power to paths corresponding to a number of patch antennas included in the power transmitting antenna array 334. The phase shifter 333 may shift the respective phases (or delays) of a plurality of AC powers provided from the distributing circuit 332. A plurality of phase shifters 333 may be provided and, for example, the same number of phase shifters 333 as the number of patch antennas included in the power transmitting antenna array 334 may be provided. For example, a hardware element, such as HMC642 or HMC1113, may be used as the phase shifter 333. The shift degree of each phase shifter 333 may be controlled by the control circuit 102. The control circuit 102 may determine the position of the electronic device 150, and may shift respective phases of the plurality of AC powers such that RF waves generate constructive interference (that is, perform beamforming) at the position of the electronic device 150 (or at the position of the power receiving antenna 341 of the electronic device 150). The respective patch antennas included in the power transmitting antenna array 334, based on the received power, may generate sub-RF waves. The RF wave whose sub-RF waves are interfered may be converted to a current, voltage, or power by the power receiving antenna 341 to then be output. The power receiving antenna 341 may include a plurality of patch antennas, and may generate a current, voltage, or power of an AC waveform using an RF wave (i.e., an electromagnetic wave) formed around the antenna, which may be referred to as a "received power". The rectifying circuit 342 may rectify the received power into a DC waveform. The converting circuit 343 may increase or reduce a voltage of the power of a DC waveform to a predetermined value, and may output the same to a power management integrated circuit (PMIC).

At least one of the power transmitting circuit 109 or the power receiving circuit 159, according to an embodiment, may include both hardware for the induction or resonance method in FIG. 3B and hardware for the electromagnetic-wave method in FIG. 3C. In this case, the control circuit 102 or the control circuit 152 may select a charging method depending on various conditions, and may perform control so as to drive hardware corresponding to the selected charging method. Alternatively, the control circuit 102 or the control circuit 152 may use both the induction or resonance method and the electromagnetic-wave method, or may transmit and receive power by driving all of the included hardware.

Figure 4:
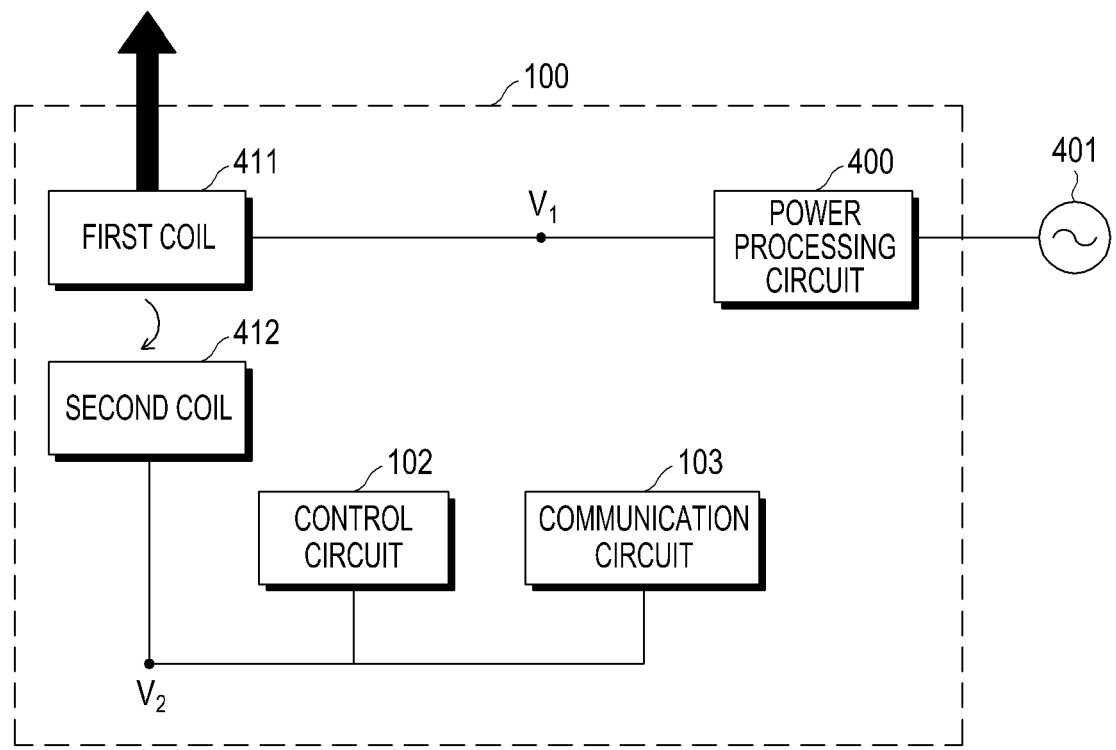
FIG. 4 is a block diagram of a wireless power transmitting device according to an embodiment.

FIG. 4 is a block diagram of a wireless power transmitting device 100 according to an embodiment.

Referring to FIG. 4, the wireless power transmitting device 100 may be wired to a wall power source 401. The wall power source 401 may provide AC power of a predetermined voltage. For example, the wall power source 401 may provide AC power of 220 Vrms, but those skilled in the art will readily understand that the magnitude of the AC power is not limited thereto. A power processing circuit 400 may process the power received from the wall power source 401. The power processing circuit 400 may include a rectifying circuit for rectification and an inverting circuit for inverting the rectified power. The power processing circuit 400 may rectify, for example, AC power of 220 Vrms, and thus may convert the power to DC power of 311V. The DC power may be applied to the inverting circuit. The inverting circuit may provide DC power for a first time period, and might not provide DC power for a second time period after the first time period in accordance with a control signal from the signal generating circuit. The first time period and the second time period may be substantially the same, and may be determined according to a frequency for wireless power transmission. In the case where the inverting circuit is a half-bridge DC/AC converting circuit, the first coil 411, for example, may be applied with AC power of 110 Vrms. A magnetic field may be induced in the first coil 411 by means of the applied AC power. The second coil 412 may be disposed near the first coil 411. An induced electromotive force (that is, AC power) may be generated in the second coil 412 by means of some of the magnetic field generated from the first coil 411. The voltage value of the AC power generated in the second coil 412 may be determined by a turn ratio between the first coil 411 and the second coil 412. Equation (1) below represents a mathematical formula for explaining an electromagnetic induction phenomenon.

$$\frac{V_2}{V_1} = \frac{N_2}{N_1} \qquad \text{Equation (1)}$$

In Equation (1) above, V1 is a voltage applied to the first coil 411, V2 is a voltage applied to the second coil 412, N1 is a number of windings of the first coil 411, and N2 is a number of windings of the second coil 412. Accordingly, the magnitude of the voltage of the AC power generated in the second coil 412 may be N2/N1 times the voltage applied to the first coil 411. The magnitudes of the voltages required for the respective hardware components (e.g., the control circuit 102, the communication circuit 103, or the power processing circuit 400) included in the wireless power transmitting device 100 may be known in advance. The turn ratio of the first coil 411 to the second coil 412 may be determined depending on the magnitude of a voltage required for the hardware component. For example, the inverting circuit of the power processing circuit 400 may require DC power of 15V. Accordingly, the power output from the second coil 412 may have a voltage of 10.6 Vrms and a turn ratio (N2/N1) of 10.6/110 (i.e., 0.0964), and the first coil 411 and the second coil 412 may be manufactured so as to have the above turn ratio. At least one rectifying circuit may be connected to an output end of the second coil 412 so that DC power may be provided to at least one of the control circuit 102, the communication circuit 103, or the power processing circuit 400. The first coil 411 and the second coil 412 may be wound around a single core. The first coil 411 and the second coil 412 may be wound around a single core in the same portion thereof, or may be wound around a single core in different portions thereof, respectively. The first coil 411 and the second coil 412 may be separately wound around a plurality of cores.

Figure 5A:
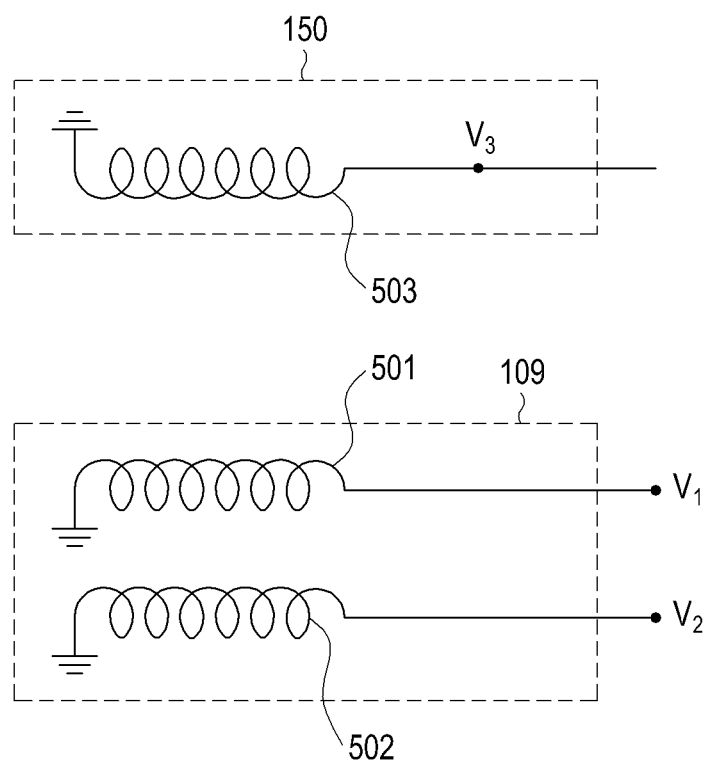
FIGS. 5A, 5B, and 5C are illustrations of coils according to an embodiment.
Figure 5B:
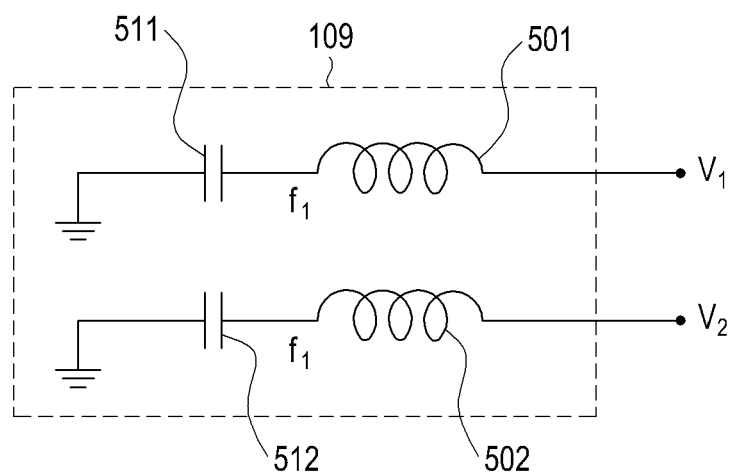
Figure 5C:
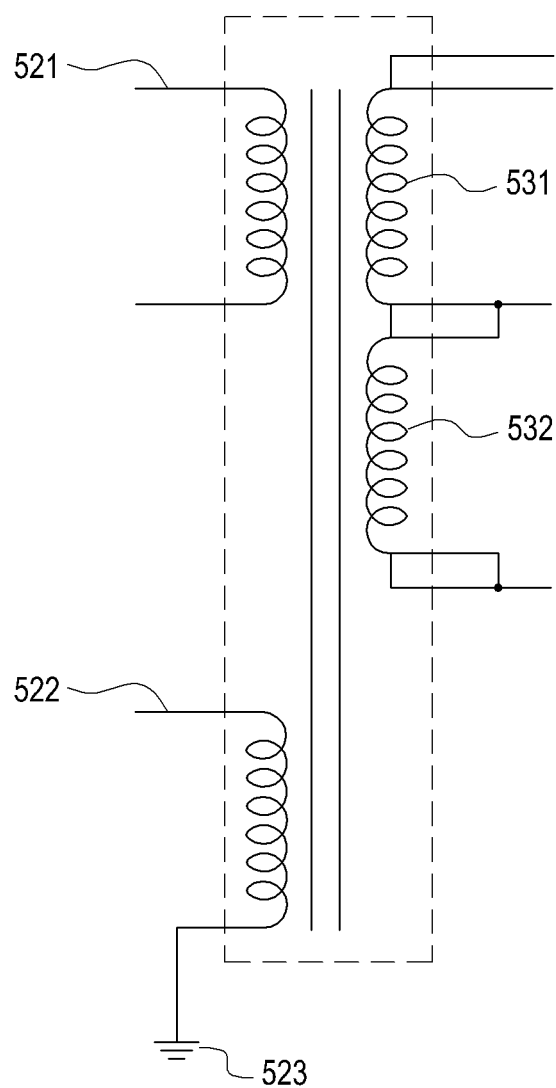

FIGS. 5A, 5B, and 5C are illustrations of coils according to an embodiment.

Referring to FIG. 5A, a first coil 501 in the power transmitting circuit 109 of the wireless power transmitting device 100 may be intended for power transmission. A voltage V1 may be applied to the first coil 501. In addition, a second coil 502 in the power transmitting circuit 109 may be intended to provide power to the hardware component included in the wireless power transmitting device 100 or to the hardware component connected to the wireless power transmitting device 100 by a wire. As described above, an induced electromotive force may be generated in the second coil 502 by means of a magnetic field generated from the first coil 501 and whose magnitude varies with time. The magnitude of the voltage V2 applied to the second coil 502 may be determined according to a turn ratio between the first coil 501 and the second coil 502. The electronic device 150 may include a third coil 503 for receiving power, and the third coil 503 may also generate an induced electromotive force by means of a magnetic field generated from the first coil 501 whose magnitude varies with time. A voltage V3 may be applied to the third coil 503. Although the coils 501, 502 and 503 are illustrated as being grounded at one end thereof in FIG. 5A, this is merely an example, and the present disclosure is not limited thereto. At least one of the coils 501, 502 and 503 may be connected with a single hardware component at both ends thereof, or may be connected with a plurality of hardware components at both ends thereof.

Referring to FIG. 5B, a first capacitor 511 may be connected to the first coil 501, and a second capacitor 512 may be connected to the second coil 502. Accordingly, the first coil 501 and the first capacitor 511 may constitute a first resonance circuit, and the first resonance circuit may have a first resonance frequency f1. The second coil 501 and the second capacitor 512 may constitute a second resonance circuit, and the second resonance circuit may also have a first resonance frequency f1. As described above, the number of windings of the second coil 502 may be different from the number of windings of the first coil 501, and thus the reactance of the first coil 501 and the reactance of the second coil 502 may be different from each other. The capacitance of the first capacitor 511 may also be set different from the capacitance of the second capacitor 512 so as to have the same resonance frequency. In the case of configuring a resonance circuit as shown in FIG. 5B, a quality factor or Q factor of the induced electromotive force generated in the second coil 502 may be improved. Although the capacitors 511 and 512 are illustrated as being connected in series to the respective coils 501 and 502 in FIG. 5B, this is only an example, and in an embodiment, the capacitors 511 and 512 may be connected to the respective coils 501 and 502 in series or in parallel.

Referring to FIG. 5C, the first coil 521 for power transmission of the wireless power transmitting device 100, based on an applied AC power, may generate a magnetic field whose magnitude varies with time. The second coil 522 of the wireless power transmitting device 100 may be grounded at one end thereof. Based on the magnetic field generated from the first coil 521 and whose magnitude varies with time, the second coil 522 may generate an induced electromotive force, and the induced electromotive force, for example, may be rectified to then be provided to at least one of the hardware components (e.g., the control circuit 102, the communication circuit 103, the power processing circuit 400, and the like) in the wireless power transmitting device 100. A third coil 531 and a fourth coil 532 of the electronic device 150 receiving the wireless power may be connected to each other. In this case, the power received from the third coil 531 and the fourth coil 532 may be processed and used for operation of the electronic device 150 or for charging an internal battery. In an embodiment, the third coil 531 and the fourth coil 532 may not be connected to each other. If the number of windings of the third coil 531 is different from that of the fourth coil 532, the magnitude of a voltage of the induced electromotive force generated in the third coil 531 may be different from the magnitude of a voltage of the induced electromotive force generated in the fourth coil 532. For example, the induced electromotive force generated in the third coil 531 may be rectified to then be provided to a first hardware component (e.g., the display 154) of the electronic device 150, and the induced electromotive force generated in the fourth coil 532 may be rectified to then be provided to a second hardware component (e.g., the communication circuit 153) of the electronic device 150. Accordingly, the electronic device 150 can provide required voltages to the respective hardware components without a plurality of circuits for a down-converting operation.

FIGS. 6A, 6B, 6C, and 6D are illustrations of a plurality of coil arrangements according to an embodiment.

Figure 6A:
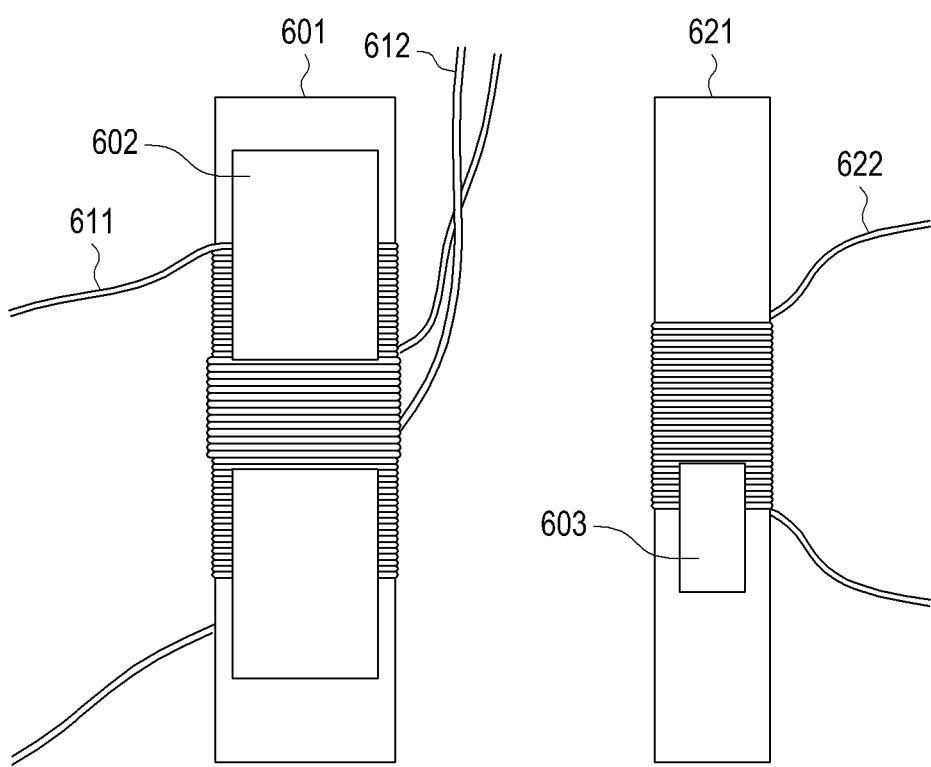
FIGS. 6A, 6B, 6C, and 6D are illustrations of a plurality of coil arrangements according to an embodiment.

Referring to FIG. 6A, a first coil 611 may be wound around a first core 601. The first coil 611 may be a coated wire. Tape 602 for fixing the first coil 611 to the first core 601 may be attached to at least a portion of the first core 601 and to at least a portion of the first coil 611. The first core 601 and the second core 621 may be made of a material having a relatively high permeability. The first core 601 and the second core 621 may be made of a material, such as ferrite, and may be made of any material capable of increasing magnetic flux. A second coil 612 may be wound on the outer side of the first coil 611 and on the tape 602. The second coil 612 may also be a coated wire. For example, the first coil 611 may be intended for power transmission, and the second coil 612 may be intended to transmit power to the hardware component, but the positions thereof are not limited. In an embodiment, a coil for transmitting power to the hardware component may be wound on a relatively inner side, and a coil for power transmission may be wound on a relatively outer side. The electronic device for receiving power may include the second core 621, and the second core 621 may be wound with a third coil 622. The third coil 622 may be fixed to the second core 621 by tape 603 is attached to at least a portion of the third coil 622 and to at least a portion of the second core 621.

Figure 6B:
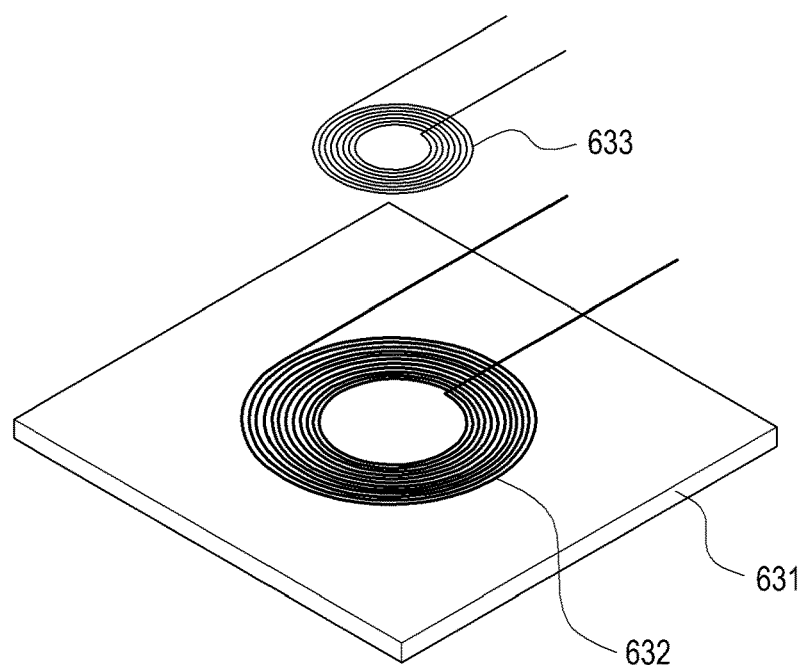
Figure 6C:
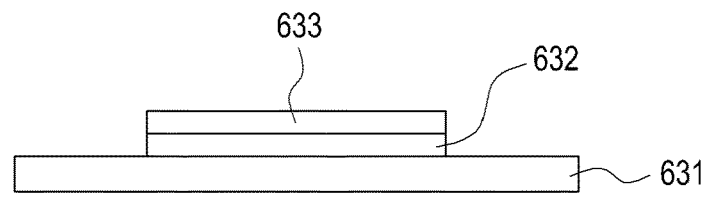

Referring to FIGS. 6B and 6C, a first coil 632 may be positioned on a planar ferrite 631, and a second coil 633 may be positioned on the first coil 632. In this case, the first coil 632, the second coil 633, and the ferrite may be configured to be stacked, instead of configuring such that the ferrite is provided inside the first coil 632 or the second coil 633.

Figure 6D:
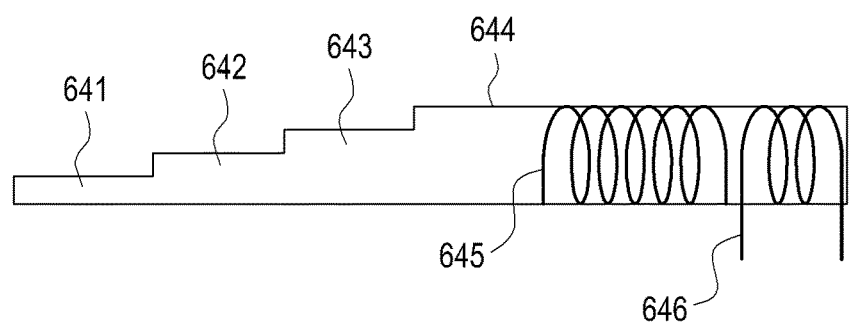

Referring to FIG. 6D, a ferrite may be configured to have a plurality of steps 641, 642, 643, and 644. A first coil 645 and a second coil 646 may be wound around at least one of the plurality of steps 641, 642, 643, and 644.

Figure 7:
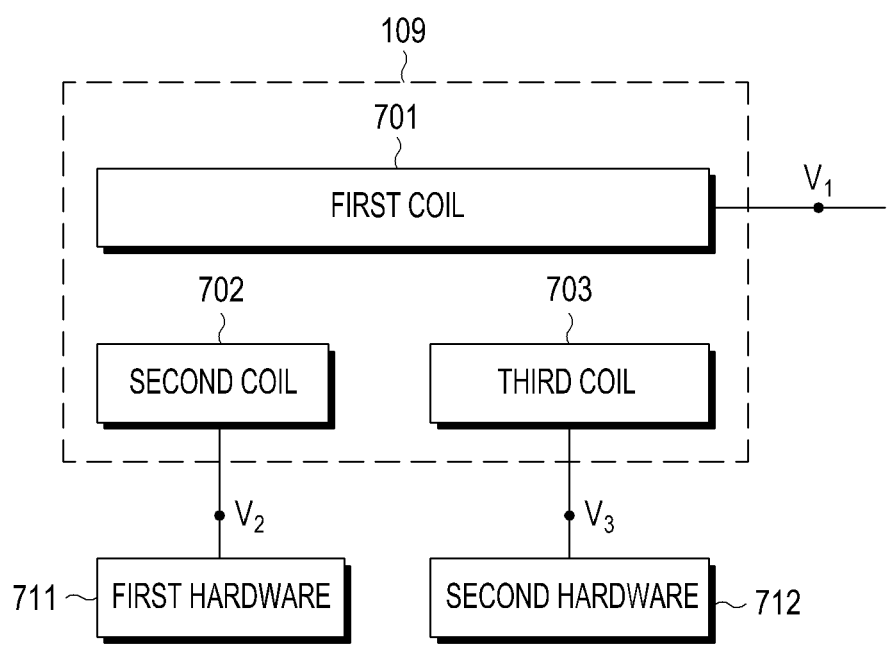
FIG. 7 is a block diagram of coils according to an embodiment.

FIG. 7 is a block diagram of coils according to an embodiment.

Referring to FIG. 7, the power transmitting circuit 109 of the wireless power transmitting device 100 may include a first coil 701 for providing power to the electronic device 150. A voltage V1 may be applied to the first coil 701. The first coil 701 may generate a magnetic field by means of an AC power input thereto, and thus an electronic device near the first coil 701 may wirelessly receive power. The magnetic field generated in the first coil 701 may cause the second coil 702 and the third coil 703 inside the wireless power transmitting device 100 to generate an induced electromotive force. For example, the first hardware component 711 of the wireless power transmitting device 100 may require an operation voltage V2, and the second hardware component 712 thereof may require an operation voltage V3. The turn ratio between the first coil 701 and the second coil 702 may be different from the turn ratio between the first coil 701 and the third coil 703, and thus the coil 702 may output a voltage V2 and the third coil 703 may output a voltage V3. A rectifying circuit may be connected between the second coil 702 and the first hardware component 711, and a rectifying circuit may be connected between the third coil 703 and the second hardware component 712. Accordingly, the first hardware component 711 and the second hardware component 712 may be provided with a voltage V2 and a voltage V3, respectively. In an embodiment, the second coil 702 may output an alternating current having a voltage V2 after rectification and the second coil 702 may output an alternating current having a voltage V3 after rectification.

Figure 8A:
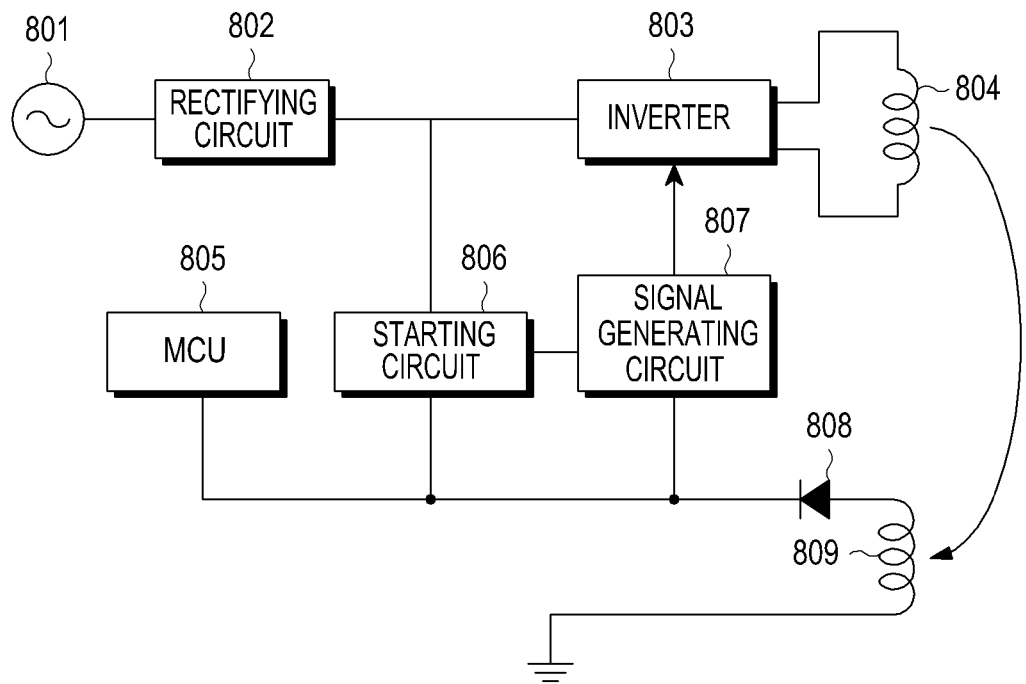
FIGS. 8A and 8B are block diagrams of a wireless power transmitting device according to an embodiment.

FIG. 8A is a block diagram of a wireless power transmitting device according to an embodiment.

Referring to FIG. 8, the wireless power transmitting device (e.g., the wireless power transmitting device 100) may include a rectifying circuit 802, an inverter 803, a first coil 804, an MCU 805, a starting circuit 806, a signal generating circuit 807, a second rectifying circuit 808, and a second coil 809. The rectifying circuit 802 of the wireless power transmitting device 100 may receive AC power from an external power source 801. The rectifying circuit 802 may rectify the received AC power to thus provide the rectified DC power to the inverter 803. Alternatively, the rectifying circuit 802 may provide the rectified DC power to the starting circuit 806. At the beginning of driving, the rectifying circuit 802 may provide DC power to the starting circuit 806. The signal generating circuit 807 may provide a control signal to the inverter 803, and the inverter 803 may or may not apply, to the first coil 804, DC power rectified based on the provided control signal. The signal generating circuit 807 may operate using the induced electromotive force generated by the second coil 809 after the driving is started, but the induced electromotive force has not yet been generated in the second coil 809 at the beginning of the driving. Accordingly, the signal generating circuit 807 may receive power from the starting circuit 806 for usage at the beginning of the driving. The starting circuit 806 may provide the power for driving to the signal generating circuit 807 using the power supplied from the rectifying circuit 802.

The signal generating circuit 807 may receive the power and provide a control signal to the inverter 803, and thereafter, AC power may be applied to the first coil 804 by the operation of the inverter 803 so that an induced electromotive force may be generated in the second coil 809 as well. AC power by means of the induced electromotive force may be rectified by the second rectifying circuit 808 to then be provided to at least one of the MCU 805, the starting circuit 806, or the signal generating circuit 807. The starting circuit 806 may be configured to stop providing power to the signal generating circuit 807 upon confirming that power is provided from the second coil 809. The starting circuit 806 is not limited to a certain configuration as long as it can provide power from the rectifying circuit 802 so as to correspond to a driving voltage of the signal generating circuit 807.

Figure 8B:
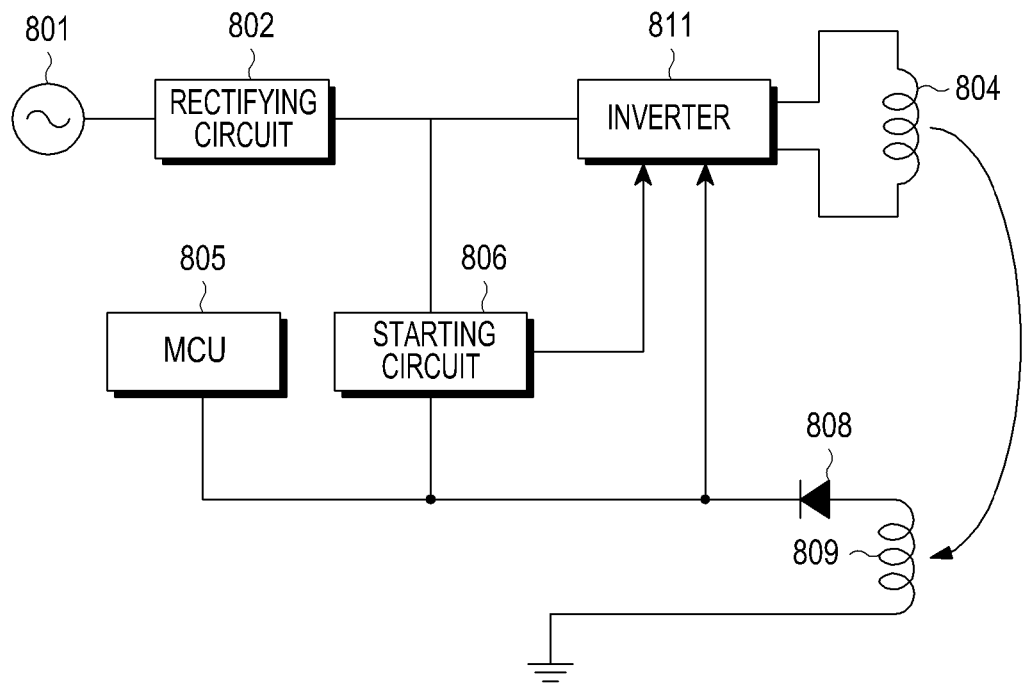

Referring to FIG. 8B, an inverter 811 may include a circuit for inverting and the signal generating circuit 807. For example, the inverter 811 may convert a received direct current into an alternating current to thus output the same, instead of receiving a control signal from an external circuit. The inverter 811 may operate using the induced electromotive force generated by the second coil 809 after the driving is started, but the induced electromotive force has not yet been generated in the second coil 809 at the beginning of the driving. Accordingly, the inverter 811 may receive power from the starting circuit 806 for usage at the beginning of the driving. The starting circuit 806 may provide the power for driving to the inverter 811 using the power supplied from the rectifying circuit 802. The inverter 811 may receive power, and may supply AC power to the first coil 804 using the received power. AC power by means of the induced electromotive force may be rectified by the second rectifying circuit 808 to then be provided to at least one of the MCU 805, the starting circuit 806, or the inverter 811. The starting circuit 806 may be configured to stop providing power to the inverter 811 upon confirming that power is provided from the second coil 809.

The wireless power transmitting device 100, according to an embodiment, may include a battery therein. The internal battery may receive power from the second coil 809, and may store the received power. At the time of starting the driving, at least one of the inverter 803 or the signal generating circuit 807 may operate using the power stored in the battery. In this case, the wireless power transmitting device 100 may not include the starting circuit 806. Alternatively, when the wireless power transmitting device 100 is not connected to an external power source 801, it may operate using the power stored in the internal battery.

Figure 9:
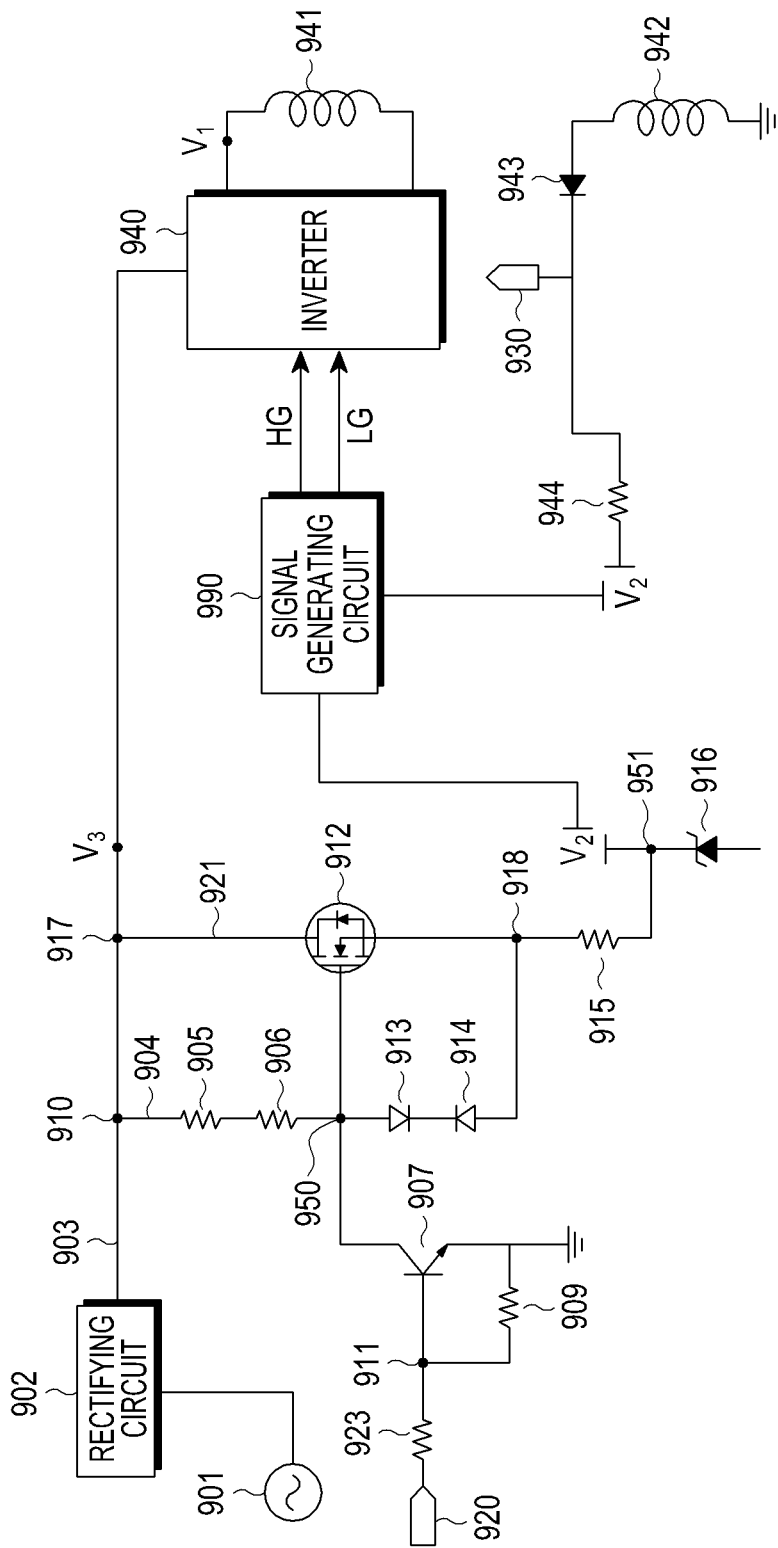
FIG. 9 is a circuit diagram of a starting circuit according to an embodiment.

FIG. 9 is a circuit diagram of a starting circuit according to an embodiment.

Referring to FIG. 9, the rectifying circuit 902 may receive AC power from an external power source 901, and may rectify the same to thus output DC power through the power path 903. A node 910 and a node 917 on the power path 903, for example, may be applied with a voltage V3. Resistors 905 and 906 may be connected to a power path 904 connected to the node 910, and the resistance values of the resistors 905 and 906 may be determined such that a certain voltage (e.g., Vref) is applied to a node 950. A switch 907 may be connected to the node 950. When the voltage of the node 950 is equal to the voltage of the node 911, the switch 907 may be controlled to be in the ON state such that the node 950 is grounded. When the voltage of the node 950 is different from the voltage of the node 911, the switch 907 may be controlled to be in the OFF state such that the node 950 is disconnected from the elements (e.g., 923, 909, and the ground) connected to the switch 907. At the beginning of the driving (that is, at the time at which the inverter 940 starts an inverting operation), AC power cannot be applied to a first coil 941 unless starting circuits are provided. Accordingly, an induced electromotive force may not be generated in a second coil 942, and the magnitude of a voltage applied to a terminal 930 may be zero. The terminal 930 may be interlocked with a terminal 920, and the voltage of the terminal 930 may be equal to the voltage of the terminal 920. Thus, the voltage of the terminal 920 may also be zero at the beginning of the driving. Since the voltage at the terminal 920 is zero, the voltage at the node 911 may be zero. Since the voltage Vref of the node 950 is different from the voltage (i.e., zero) of the node 911, the switch 907 may be in the OFF state, and the voltage of the node 950 may be maintained at Vref. If the voltage at the node 950 is Vref, the switch 912 may be controlled to be in the ON state. Thus, power may be provided from the node 917 to a node 918 via a power path 921. The value of the resistor 915 and the breakdown voltage of the Zener diode 916 may be set such that the voltage at the node 951 is V2. In this case, the voltage V2 may be an operation voltage of the signal generating circuit 990. Diodes 913 and 914 may prevent power from being supplied from the node 918 to the node 950. Accordingly, the signal generating circuit 990 may be supplied with a voltage V2, and may alternately and periodically supply a high signal (HG) and a low signal (LG) to the inverter 940 using the voltage V2. The inverter 940 may apply DC power from the rectifying circuit 902 to the first coil 941 when HG is received, and might not apply DC power from the rectifying circuit 902 to the first coil 941 when LG is received. Thus, AC power may be applied to the first coil 941, and an induced electromotive force may also be generated in the second coil 942. AC power by means of the induced electromotive force may be rectified by a diode 943. The value of a resistor 944 may be set such that the rectified power has a voltage V2 and the terminal 930 has a voltage V2. The position of the resistor 944 is not limited. Therefore, a voltage V2 output from the second coil 942 and rectified by the diode 943 may be provided to the signal generating circuit 990, and the signal generating circuit 990 may generate and output a control signal for the inverter 940 using the received power. Since the voltage applied to the terminal 930 is V2, the voltage applied to the terminal 920 may also be V2. The values of the resistors 923 and 909 may be set such that the node 911 has a voltage Vref. Accordingly, when a voltage V2 is applied to the terminal 920, a voltage Vref may be applied to the node 911. Since the voltage value of the node 911 is the same as that of the node 950, the switch 907 may be controlled to be in the ON state so that the node 950 may be connected to the ground. Thus, the voltage of the node 950 does not correspond to the ON state-voltage of the switch 912, so that the switch 912 may be controlled to be in the OFF state. As the switch 912 is controlled to be in the OFF state, no power is provided through the power path 921 and the provision of the voltage V2 to the node 951 may be interrupted. Thereby, after starting driving, the signal generating circuit 990 may operate using only the induced electromotive force from the second coil 942.

Figure 10:
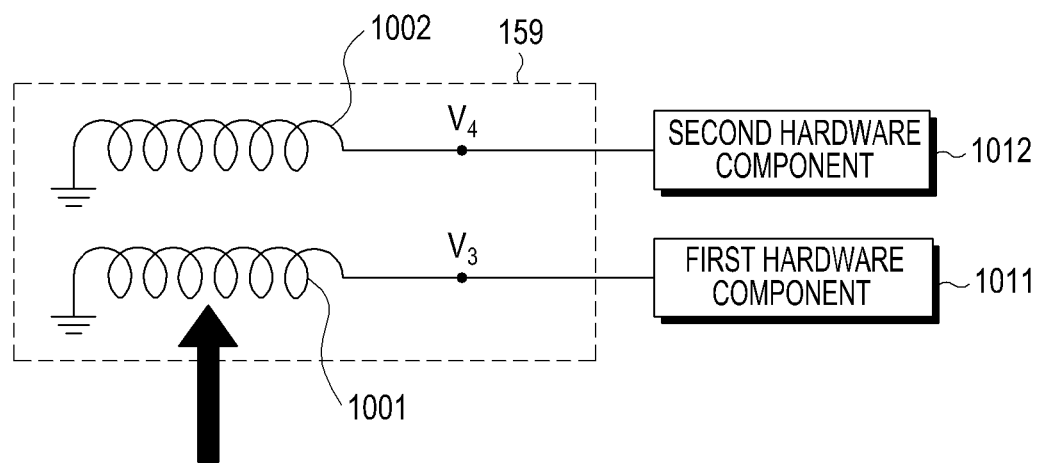
FIG. 10 is an illustration of a coil of an electronic device for wirelessly receiving power according to an embodiment.

FIG. 10 is an illustration of a coil of an electronic device 150 for wirelessly receiving power according to an embodiment.

Referring to FIG. 10, the electronic device 150 may include a plurality of coils 1001 and 1002 inside the power receiving circuit 159. The plurality of coils 1001 and 1002 may be different from each other in the number of windings thereof. The respective coils 1001 and 1002 may be wound around a single core. The plurality of coils 1001 and 1002 may be wound around a single core in the same portion thereof, or may be wound around a single core in different portions thereof. The plurality of coils 1001 and 1002 may be separately wound around respective cores. Since the number of windings of the first coil 1001 is different from that of the second coil 1002, the output voltage V3 of the first coil 1001 may be different from the output voltage V4 of the second coil 1002. The first hardware component 1011 may use the output voltage V3 and the second hardware component 1012 may use the output voltage V4. A rectifying circuit or a converting circuit may be connected between a coil and a hardware component.

The electronic device 150, according to an embodiment, may include an internal battery. The internal battery, for example, may be connected to the second coil 1002 to receive power therefrom. If the electronic device 150 does not receive sufficient power from the wireless power transmitting device 100, the electronic device 150 may operate the hardware component using the power stored in the internal battery. Alternatively, if the voltage magnitude of the power output from the rectifying circuit is unstable, the electronic device 150 may operate the hardware component using the power stored in the internal battery. The electronic device 150 may include a first internal battery connected to the first coil 1001 and a second internal battery connected to the second coil 1002. In this case, the electronic device 150 may allow the first hardware 1011 to operate using the power from the first internal battery, and may allow the second hardware 1012 to operate using the power from the second internal battery.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. A wireless power transmitting device for wirelessly transmitting power to an external electronic device, comprising:
    a first coil having a first number of windings configured to wirelessly transmit power to the external electronic device by a magnetic field;
    a second coil having a second number of windings which is different from the first number of windings, and configured to generate, based on the magnetic field which is generated by the first coil, an induced electromotive force; and
    at least one hardware component,
    wherein the at least one hardware component of the wireless power transmitting device operates based on the induced electromotive force, and
    wherein a ratio of a voltage applied to the first coil to a voltage applied to the second coil is determined by a ratio of the first number of windings to the second number of windings.

2. The wireless power transmitting device of claim 1, further comprising a core around which the first coil and the second coil are wound.

3. The wireless power transmitting device of claim 2, wherein the first coil is wound around the core and the second coil is wound on an outer side of the first coil.

4. The wireless power transmitting device of claim 1, further comprising a planar ferrite,
    wherein the first coil is disposed on the planar ferrite and the second coil is disposed on the first coil.

5. The wireless power transmitting device of claim 1, further comprising a rectifying circuit configured to be connected to the second coil and the at least one hardware component and to rectify alternating current (AC) power generated by the induced electromotive force into direct current (DC) power to thus provide the DC power to the at least one hardware component.

6. The wireless power transmitting device of claim 1, wherein a turn ratio of the first number of windings to the second number of windings is set by a ratio of a voltage applied to the first coil to an operation voltage of the at least one hardware component.

7. The wireless power transmitting device of claim 1, further comprising:
    a first capacitor connected to the first coil; and
    a second capacitor connected to the second coil,
    wherein a resonance frequency of a resonance circuit configured by the first coil and the first capacitor is equal to a resonance frequency of a resonance circuit configured by the second coil and the second capacitor.

8. The wireless power transmitting device of claim 1, further comprising a third coil configured to have a third number of windings, which is different from the first number of windings and the second number of windings,
    wherein another hardware component different from the at least one hardware component of the wireless power transmitting device operates by an induced electromotive force generated, based on the magnetic field, in the third coil.

9. The wireless power transmitting device of claim 1, further comprising:
    a rectifying circuit configured to receive alternating current (AC) power externally and to rectify the AC power to direct current (DC) power;
    an inverter configured to apply the DC power to the first coil during a first period and not apply the DC power to the first coil during a second period; and
    a signal generating circuit configured to generate a first control signal that allows the inverter to apply the DC power during the first period and a second control signal that allows the inverter to not apply the DC power during the second period and to alternately provide the first control signal and the second control signal to the inverter.

10. The wireless power transmitting device of claim 9, further comprising a starting circuit configured to:
    apply power to the signal generating circuit using the DC power from the rectifying circuit when driving of the wireless power transmitting device is started, and
    stop providing the power to the signal generating circuit when the induced electromotive force is generated from the second coil.

* * * * *